United States Patent [19]

Calk

[11] 4,134,682
[45] Jan. 16, 1979

[54] WHEEL MIRROR CALIBRATING DEVICE

[76] Inventor: Walter R. Calk, 2545 Pine Bluff Dr., Dallas, Tex. 75228

[21] Appl. No.: 743,305

[22] Filed: Nov. 19, 1976

[51] Int. Cl.² .................... G01B 11/27; G01B 11/275
[52] U.S. Cl. ................................. 356/155; 33/203.18
[58] Field of Search ............................. 356/154–155, 356/243, 256; 350/307; 73/1 E, 1 R; 33/203.18, 203

[56] References Cited

U.S. PATENT DOCUMENTS

| 2,641,957 | 6/1953 | Vandermeer | 356/155 |
|---|---|---|---|
| 2,656,762 | 10/1953 | Carr | 356/155 |
| 2,795,859 | 6/1957 | Buschbach | 356/155 |
| 3,081,546 | 3/1963 | Wilkerson | 33/203.18 |

OTHER PUBLICATIONS

Schlesinger, G. "Testing Machine Tools", Pergamon Press, 1978, Eighth Edition, pp. 5–8.
Levin et al. "New Method of Verifying Instruments for Flatness Testing", Soviet Jr. of Optical Tech. vol. 42, 8–1975, pp. 469–472.

Primary Examiner—John K. Corbin
Assistant Examiner—Wm. H. Punter
Attorney, Agent, or Firm—Gerald G. Crutsinger; Larry B. Dwight

[57] ABSTRACT

A wheel mirror calibrating device for checking and aligning mirrors used on motor vehicle wheel alignment equipment. The device comprises a portable unit comprising support and level members to align a rotatable horizontal shaft which supports a truncated triangular mirror support frame. The mirror support frame supports the wheel alignment mirror in the same manner as the rim of the wheel which would be aligned with the equipment. The frame has calibrated adjustment push screws for alignment of the mirror support pads to the zero position. An image is projected onto the mirror and reflected to a projection screen such that as the mirror is rotated the image must remain in the same position or the mirror needs alignment. Each mirror is individually adjustable by three screws on the back thereof for alignment of the mirror.

15 Claims, 10 Drawing Figures

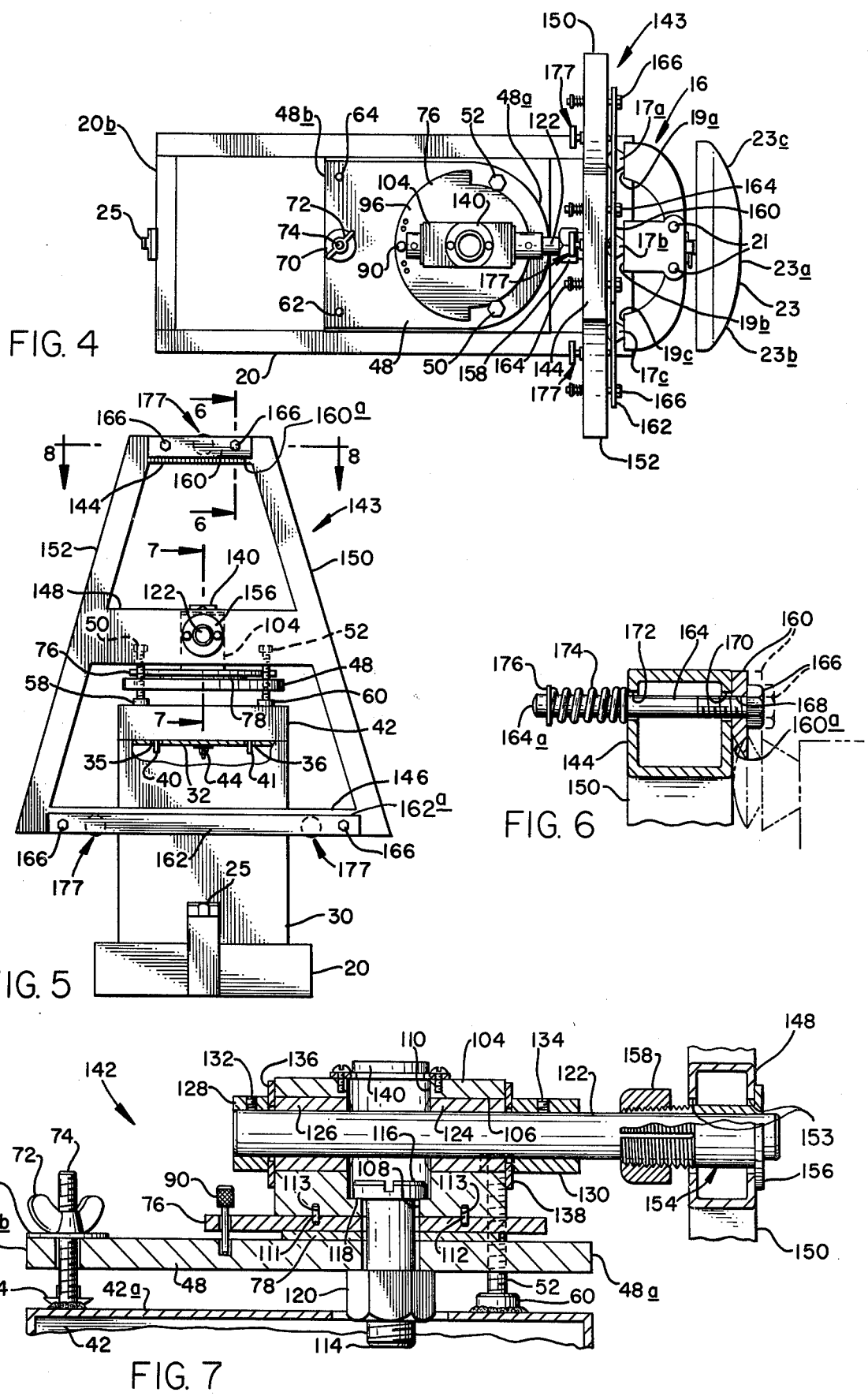

WHEEL MIRROR CALIBRATING DEVICE

BACKGROUND

Several commercial wheel alignment devices use mirrors and a projection beam to align the wheel on the vehicle. The mirrors are often times dropped, or due to age must be checked, to assure that they are perfectly aligned for giving accurate alignments of the automobile suspension system. Without accurate alignment of the automobile suspension system undue wear on the tires may result. Wheel alignment devices used today cannot be used to check the mirror since the wheel alignment device may itself be out of alignment. Heretofore, defective mirrors have been sent back to the factory for replacement which is expensive and causes undue delay in use of the equipment which cannot be afforded.

The mirror assembly attaches to the rim of the wheel to be checked. The mirror assembly comprises a first mirror which is substantially perpendicular to the axis of the wheel and two side mirrors which may be perpendicular to a radial line 15° or 20° relative to the perpendicular axis of the wheel, depending on the model.

SUMMARY

I have devised a portable device for checking wheel alignment mirrors and repairing same. The device comprises a projector which projects an image outwardly toward the mirror which is reflected back to a screen adjacent the projector.

The mirror holding device comprises a support base having a sliding base moveable relative to the support base. A base plate is moveably secured above the sliding base. A pivot plate is pivotally secured by a bolt through the center thereof to the base plate. A mandrel and shaft assembly is rigidly secured to the pivot plate to support a shaft rotatably secured through the bearings of the mandrel. The shaft is aligned horizontally with the base plate such that adjustment of the base plate may be accomplished to level the shaft. A bull's-eye spirit level is secured to the mandrel to aid in leveling the shaft. The shaft is moveable from the first position which extends outwardly perpendicular to the base to two positions 15° and 20° left and right of the perpendicular position.

A mirror support frame is secured to the shaft by a collet or other means so that the frame and shaft are rotatably secured in the bearings of the mandrel. The mirror buttons are secured to upper and lower support bars which have bevelled edges thereon. The bars are secured by spring-loaded shafts to the upper and lower cross members of the mirror support frame. Adjustment screws are secured to the top and to the bottom for zeroing the mirror support bars. The mirror is secured to the mirror pad support bars by loosening the clamp and securing the buttons on the mirror over the bevelled edges in the same manner the mirror would be secured to the rim of the wheel to be aligned.

The beam is adjusted to project onto the mirror in the 90° position for checking the middle mirror for a perpendicular position to the shaft. Next the mirror support buttons are adjusted by movement of the adjustment screws on the mirror support bar, then the buttons are shimmed according to the amount indicated. Then, the side mirrors are adjusted.

The primary object of the invention is to provide a portable device for checking and aligning a wheel alignment mirror, thereby preventing the necessity of long periods of discontinued use or down time of the wheel alignment device.

A further object of the invention is to provide a lightweight portable device which may be carried to the site for repairing or aligning mirrors which may have been dropped or otherwise damaged.

A still further object of the invention is to provide a wheel alignment device which checks the mirror independent of the aligning equipment to assure proper alignment of the mirrors.

Other and further objects of the invention will become apparent upon referring to the detailed description hereinafter following and to the drawings annexed hereto.

DESCRIPTION OF THE DRAWINGS

Drawings of a preferred embodiment of the invention are annexed hereto so that the invention may be better and more fully understood, in which:

FIG. 4 is a plan view thereof;

FIG. 5 is a right side elevational view with the mirror detached therefrom and parts broken away to more clearly illustrate the details of construction;

FIG. 6 is a cross-sectional view taken along line 6—6 of FIG. 5;

FIG. 7 is a cross-sectional view taken along line 7—7 of FIG. 5;

Numeral references are employed to designate parts and like parts are designated with like numerals throughout the various figures of the drawings.

DESCRIPTION OF A PREFERRED EMBODIMENT

Figure 1:
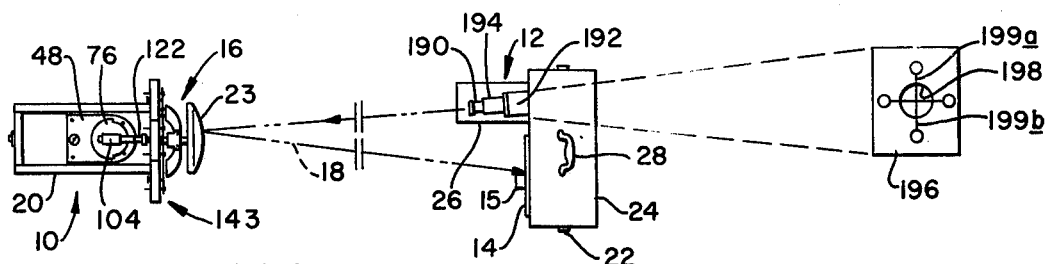
FIG. 1 is a plan view of the projector and mirror holding device.

Referring to FIG. 1 of the drawings, the device generally comprises a mirror support device 10, a projector 12, and a projection screen 14. A wheel alignment mirror assembly 16 is secured to the mirror support device 10 such that a projection beam 18 may be projected from the projector 12 onto the mirror 16 and reflected back to the projection screen 14. The mirror assemblies 16 are of a type such as mirror assemblies manufactured by John Bean Division of FMC Corporation part number 57659 for 20° and part number 57660 for 15° mirrors.

Figure 2:
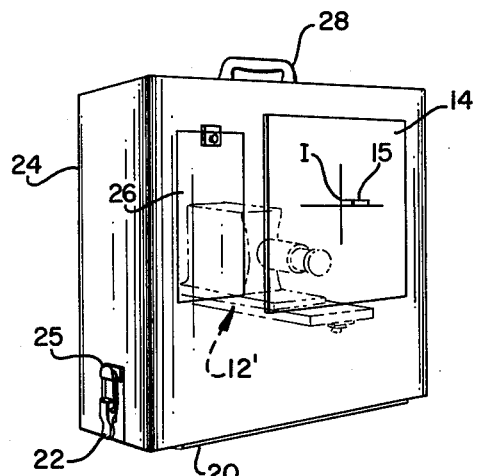
FIG. 2 is a perspective view of the case and projection screen.

Generally referring to FIG. 2, the mirror support device 10 is secured to the base 20 of a case 24 by hold-down clamps 22 which engage buttons 25. A generally rectangular case 24 is provided to support projector 12 which is pivotally secured to an access door 26 and may be folded down into a position 12' shown in dashed outline.

A handle 28 is secured to the upper end of the case for carrying same.

The mirror 16 (FIGS. 3 and 4) generally comprises three triangularly spaced buttons 17a, 17b and 17c which are secured to pads 19a, 19b and 19c by screws or the like. Pad 19b is slideably secured to parallel shafts 21 to allow vertical adjustment of pad 19b for various wheel diameters. Clamp 19 on pad 19b tightens the pad 19b securely to shafts 21. The mirror assembly support 21a has a shaft 21b rotatably secured to the mirror assembly 23. Mirrors 23a, 23b, and 23c are secured to the mirror assembly 23. Pads 19a and 19c are formed on the faces of lower cross member 19d which is rigidly secured to the lower end of parallel shafts 21.

Figure 3:
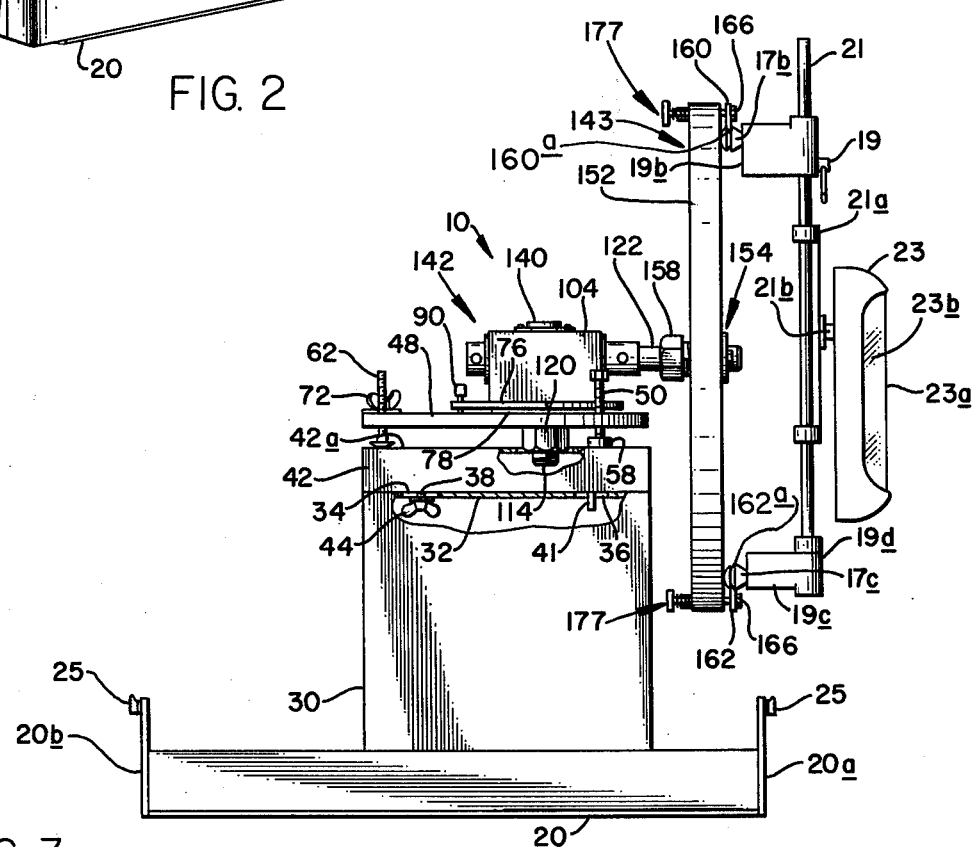
FIG. 3 is a side elevational view of the mirror holding device with parts broken away to more clearly illustrate the details of construction.

As illustrated in FIG. 3, the mirror support device 10 comprises a square support base having an upper closure means 32 and rigidly secured to the base 20. Elongated slotted passage 34, 35 and 36 are formed in the upper closure member 32 to receive threaded stud 38 and alignment dowels 40 and 41 which are downwardly depending from sliding base 42 FIGS. 3 and 5. Wing nut 44 is provided to secure sliding base 42 in a locked position by tightening same onto threaded stud 38.

Sliding base 42 (FIGS. 5 and 7) is moveable from the position substantially aligned over support base 30 to a position toward the front 20a of base 20 to allow clearance of some larger mirror assemblies 16 past the front end 20a of base 20.

Figure 9:
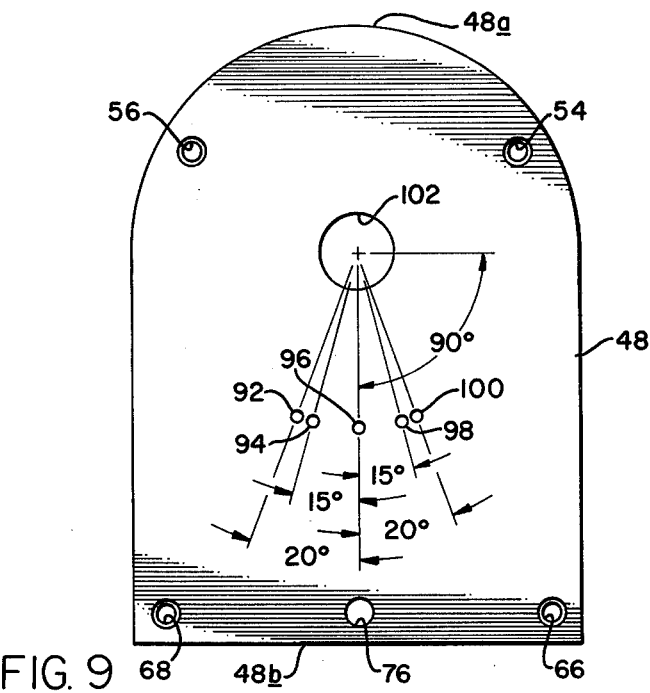
FIG. 9 is a top plan view of the base plate detached from the device.

The base plate 48 is secured to the sliding base 42 in spaced relationship. Downwardly depending shafts 50 and 52 are threaded through passages 54 and 56, as best illustrated in FIGS. 3, 4 and 9, and threadedly extend into nuts 58 and 60 which are welded or otherwise secured to sliding base 42. This allows for a fixed alignment of the front 48a of base plate 48. Downwardly depending threaded feet 62 and 64 are threadedly secured through passages 66 and 68 in the rear 48b of base plate 48 and have rounded feet which engage the upper surface 42a of sliding base 42. Shafts 50 and 52 and feet 62 and 64 adjust the relative vertical heighth of each corner of the base plate 48 relative to sliding base 42. The rear 48b of base plate 48 is secured by washer 70 and wing nut 72 threadedly secured to a shaft 74, which passes through passage 76 and is rigidly secured to the upper side of sliding base 42 by welding or the like.

As more clearly illustrated in FIG. 7, a partially circular pivot plate 76 is spaced above base plate 48 by thrust washer 78. Pivot plate 76 has apertures 80, 82, 84, 86 and 88 equally spaced circumferentially from passage 103 formed in the center of pivot plate 76. A pin 90 is adapted to pass through one of the apertures 80–88 and engage one of the counterbores 92, 94, 96, 98 and 100 formed in base plate 48 and also equally spaced circumferentially from the center of passage 102 formed in base plate 48.

A mandrel block 104 (FIG. 7) comprises a generally rectangular block having a horizontal passage 106 formed longitudinally therethrough and a vertically centered passage 108 formed therethrough having a counterbore 110 formed in the upper portion of passage 108 to form a shoulder 118. Alignment pins 111 and 112 are secured in passages 113 formed in the mandrel 104 and pivot plate 76 for proper alignment of the mandrel 104 thereon. Pivot pin means such as a threaded screw 114 having head 116 abutting shoulder 118 is axially aligned through passage 102 in base plate 48 and passage 103 in pivot plate 76 and the passage through thrust washer 78. A nut 120 is secured to the end of bolt 114 to prevent undue looseness between the pivot plate 76 and base plate 48. The thrust washer 78 prevents excessive friction between pivot plate 76 and base plate 48 to allow pivotal motion of the pivot plate 76 relative to the base plate 48.

A shaft 122 (FIG. 7) is rotatably supported by sleeve bearings 124 and 126 secured in passage 106 of mandrel 104. Means to limit longitudinal movement of shaft 122 relative to mandrel 104 comprises collars 128 and 130 having set screws 132 and 134 rigidly secured to the shaft 122 on opposite sides of mandrel 104 and spaced from the mandrel 104 by thrust washers 136 and 138 to prevent undue wear on mandrel 104.

The bull's-eye spirit level 140 (FIGS. 4 and 7) is secured to the upper end of mandrel 104 by screws or the like to aid in levelling the shaft support assembly 142 which is used to horizontally align shaft 122.

Means to support the mirror comprises a generally truncated triangular frame 143 (FIG. 5) comprising generally horizontally spaced upper member 144, lower member 146, and center support member 148 secured to side members 150 and 152. Means to secure the frame 143 to the shaft 142 generally comprises a collet 154 having a flange 156 bolted to the center of horizontal support member 148 through passage 153, FIG. 7, and a nut 158 threadedly secured to the outside of collet 154 such that as the nut 158 is advanced toward center bar 148 the collet 154 is tightened on the shaft 122 with a uniform pressure to prevent relative movement between the shaft 122 and frame 143. Uniform pressure between collet 154 and shaft 122 is desirable such that frame 143 remains perpendicular to shaft 122 when placed thereon. Frame 143 may be removed for storage in the side of case 24.

Upper and lower support bars 160 and 162 are secured to upper and lower spaced horizontal members 144 and 146, respectively. Bars 160 and 162 have a bevelled edge 160a and 162a formed on the inner side thereof as illustrated in FIG. 6. Means to secure support bars 160 and 162 generally comprises a plurality of shafts 164 axially aligned through passages 168 in the support bars 160 and 162 and passage 170 and 172 formed in the ends of horizontally spaced members 144 and 146. Resilient means such as a spring 174 disposed between horizontal members 144 and 146 and snap ring 176 (FIGS. 6 and 8) urges end 164a of shaft 164 outwardly until heads 166 on shafts 164 engage support bars 160 and 162 thus urging support bars 160 or 162 toward generally horizontal members 144 and 146 of frame 143, respectively.

Springs 174 preferably have equal strengths and are sufficiently rigid to assure equal spacing of all the pad support members 160 and 162. It should be readily apparent that other means of securing support bars 160 and 162 to the frame 143 may be used.

Figure 8:
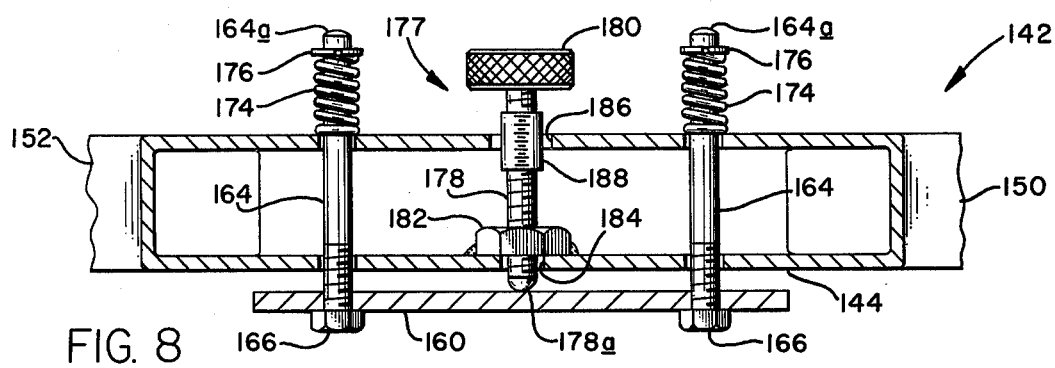
FIG. 8 is a cross-sectional view taken along line 8—8 of FIG. 5.

As best illustrated in FIG. 8, means to adjust the distance of support bars 160 and 162 relative to frame 143 comprises a threaded shaft 178 having a knurled head 180 journalled through passage 186 and is threadedly secured through nut 182 welded or otherwise secured to the interior of member 144 and the end 178a thereof which passes through passage 184 to engage the side of bar 160 or 162. As illustrated in FIG. 5, adjustment means 177 is secured to the center upper horizontal member 144 and on each side of lower support member 146. This corresponds to the three buttons 17a, 17b, and 17c on the mirror 16 which are secured in the approximate position of the adjustment means 177. A calibrated sleeve 188 (FIG. 8) is threadedly secured to shaft 178 such that screw 178 may be turned until it engages support bar 160 or 162 and sleeve 188 may be turned. In attempting to adjust the pads 19a–19c of the mirror 16, screw 178 is turned at each of the three positions until the pads 19a–19c are aligned in a vertical plane perpendicular to shaft 122. Each sleeve 188 turns with screws 178 such that the sleeve 188 indicates the proper thickness of shims to be placed between the buttons 17a–17c and the pads 19a–19c of the mirror 16.

The projection device 12 generally comprises a projector such as the Picturol Projector Model E.A.Q., a 100 watt projector from Magnavox Company, Fort Wayne, Ind. The projector 12 (FIG. 1) generally comprises a lens 190 and lamp box 192 and a barrel 194 for supporting the image I (FIG. 2) to be projected. A special brass plate 196 having an aperture 198 with cross-hairs 199a and 199b secured across the aperture 198 is provided to form the image I. Plate 196 is placed in the barrel 194 between the lamp housing 192 and lens 190. Lens 190 is adjustable to produce a focus of the image I.

The image I is projected along the beam 18 toward mirror 16 and projection screen 14. Projection screen 14 preferably is a metallic type screen painted white or some other reflective type color to easily identify the image for securing a magnetic marker to the device. A small magnet 15 may be used to mark the intersection of the cross hairs by placing same in one quadrant of the axes. Other screens are also suitable which may be marked temporarily for the position of the image I.

Operation of the hereinbefore described device is as follows:

The projector 12 is positioned in a spaced relationship to the mirror holding device 10. It should be appreciated that the longer the distance between the mirror holding device 10 and the projector 12, the greater the accuracy of the alignment device; however, it is suggested that anything greater than six feet would be suitable for the purposes herein.

The mirror 16 is attached to the frame 143 by securing buttons 17a and 17c over button support bar 162 and adjusting button 17b upwardly to engage button support bar 160 by adjusting pad 19b. Clamp 19 is tightened onto vertically spaced shafts 21 to secure the mirror onto the frame 143.

After the mirror support device 10 and projector 12 have been placed in an aligned position approximately six feet or greater apart, the projector is turned on and lens 190 is adjusted to produce an image I (FIG. 2) which is reflected from the center of mirror 23a of assembly 23 back to screen 14. This image I is focused to produce a sharp image. Once the image I has been produced a magnet 15 or other device is used to mark the center of the image I.

Base plate 48 is adjusted to level shaft 122 by movement of feet 62 and 64 to produce a bubble in the center of spirit level 140 and tighten wing nut 72 to assure a fixed level position with the mirror 16 in position on frame 143.

Rotation of the mirror assembly 23 on shaft 21b should produce a fixed image I which does not move if the center mirror 23a is aligned perfectly perpendicular to shaft 122.

Once a vertical plane has been established, the mirror assembly 23 is rotated to determine if the center member 23a is also parallel to this vertical plane which is perpendicular to shaft 122. If it is not, there are three screws generally located on the rear of the mirror 23 which may be adjusted to bring the mirror into alignment. This would depend on the model of the mirror. However, generally they are hex socket screws which may be turned with an Allen wrench.

Frame 143 is then rotated to assure that the pads 19a–19c are aligned in a vertical plane perpendicular to shaft 122. This is checked by checking to see if the center point or intersection of the cross-hairs in the image I moves from the position marked on the projection screen. If a movement of image I occurs, the proper adjustment screw means 177 (FIG. 8) is tightened inwardly to adjust the plane until no movement of the image I occurs. The calibrated sleeve 188, which is moved along with shaft 177 inwardly, can then be read to indicate the amount of space which must be compensated for to align the buttons 17a–17c in a vertical plane. Since the sleeve 188 is calibrated in thousands of an inch, these pads 19a–19c may be shimmed with 0.001 or 0.0001 of an inch circular shims which are placed between the buttons 17a–17c and the pads 19a–19c.

Figure 10:
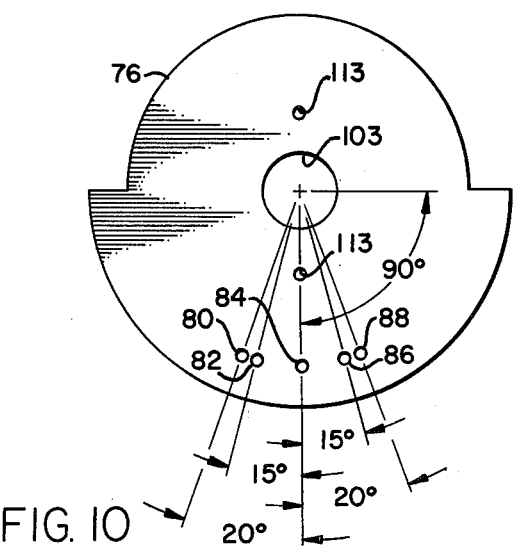
FIG. 10 is a top plan view of the pivot plate detached from the device.

To adjust the side mirrors 23b and 23c once the center mirror 23a has been adjusted, one removes the pin 90 and moves pivot plate 76 until aperture 84 is aligned with one of counterbores 92, 94, 98 or 100 FIGS. 4, 9, and 10. Counterbores 94 and 98 marked 15° are for side mirrors 23b and 23c which are turned 15° relative to a center mirror 23a. Counterbores 92 and 100 are for side mirrors 23b and 23c which are turned 20° relative to center mirror 23a. The relative angle between the side mirrors 23b and 23c to mirror 23a depends on the model of the mirror 16 being used.

The pivot plate 76 is positioned in one of these positions to adjust the mirror 23b or 23c. For instance, mirror 23b will be adjusted by moving aperture 84 to counterbore 98 placing the pin 90 back through the aperture 84 for a 15° mirror 23b. The mirror 23b is then checked for alignment of image I with the same position as center mirror 23a projected onto screen 14 of the mirror assembly 23 of shaft 21b. The mirror may then be adjusted in the same manner as mirror 23a. Likewise, mirror 23c may be adjusted by moving pivot plate 76 until aperture 84 is aligned over counterbore 94 for a 15° mirror. If mirrors 23b and 23c were 20° mirrors the aperture 84 would be aligned over the counterbore 92 and 100, respectively.

The mirror 16 may be removed from frame 143 by loosening clamp 19 and moving pad 19b downwardly to allow clearance of button 17b from bar 160.

It should be readily apparent from the foregoing that the hereinafter described invention accomplishes the objects of the invention hereinbefore discussed.

It should also be readily apparent that other and further embodiments of the invention may be devised without departing from the basic concept thereof.

Having described my invention, I claim:

1. A mirror alignment device for aligning mirrors used on wheel alignment equipment said mirrors having support structure with adjustable button pads adapted to be attached to the rim of a wheel on a vehicle comprising: means to project an image toward the mirror; a screen arranged to receive the reflected image; means to mark the position of the image on the screen; shaft support means; a shaft rotatably supported by said shaft support means; means to level said shaft support means; a frame secured to said shaft in a perpendicular plane to said shaft; support means secured to said frame for securing said mirror to said frame in a position perpendicular to said shaft, said support means having a lip adapted to receive the button pads on said mirrors; and adjustment means adapted to move said support means horizontally relative to said frame.

2. The combination called for in claim 1 with the addition of: collet means to secure the frame to the shaft in a perpendicular position.

3. The combination called for in claim 1 wherein the frame comprises: a truncated triangular shaped frame having upper, center, and lower spaced horizontal members secured to side members, said center horizontal member having a passage therethrough; and means to uniformly secure said center horizontal member to said shaft such that the frame is perpendicular to the shaft.

4. The combination called for in claim 1 wherein the shaft support means comprises: a support base; a first support plate adjustably secured to said support base; a second support plate pivotally secured to said first support plate; a mandrel secured to said second support plate having a bore formed horizontally therethrough; said shaft being rotatably secured through said bore and extending outwardly therefrom; and means to limit longitudinal movement of said shaft through said bore.

5. A mirror alignment device for aligning mirrors on wheel alignment equipment comprising: means to project an image toward the mirror; a screen arranged to receive the reflected image; means to mark the position of the image on the screen; shaft support means; a shaft rotatably supported by said shaft support means; means to level said shaft support means; a frame secured to said shaft in a perpendicular plane to said shaft; support means secured to said frame for securing said mirror to said frame comprising upper and lower support bars having a bevelled edge formed thereon, said bevelled edge being positioned inwardly toward the center of said frame and said support bars further being positioned horizontally on opposed sides of said shaft; means to secure said support bars to said frame; and means to move said support bars horizontally relative to said frame as the bars remain substantially perpendicular to said shaft.

6. The combination called for in claim 5 wherein the means to secure said support bars to said frame comprises: a shaft journalled through said support bars and the frame; and resilient means to urge said shaft against said support bar to urge said support bar against said frame.

7. The combination called for in claim 5 wherein the means to move said support bars horizontally comprises: threaded screws journalled through said frame and adapted to engage said support bars; said threaded screws being positioned in the center of said upper support bar and on opposed ends of the lower support bar.

8. The combination called for in claim 7 with the addition of: calibrated sleeves secured to said screws such that the distance the support bars are moved outwardly from said frame is measured by the markings on the sleeves.

9. A mirror alignment device for aligning mirrors having a support frame with attachment pads for securing the mirror to a wheel on a vehicle on wheel alignment equipment comprising: an upwardly extending support base; a base plate; means to adjustably secure said base plate to said support base to allow adjustment of said base plate; a pivot plate; means to pivotally secure the pivot plate to said base plate; means to limit pivotal movement of said pivot plate relative to said base plate; a mandrel having a hollow bore formed horizontally therethrough; means securing said mandrel to said pivot plate; a shaft rotatably positioned in said hollow bore of said mandrel and extending outwardly from one end thereof; means to limit longitudinal movement of said shaft through said hollow bore; a frame; means to uniformly secure said frame to said shaft such that said frame is perpendicular to shaft; mirror support bars having a bevelled edge formed thereon adapted to receive the attachment pads on the mirror to secure the mirror to the bars; means to moveably secure said support bars to the upper and lower edges of said frame such that the mirrors are in a perpendicular relationship to said shaft; adjustment means adapted to move said support bars horizontally relative to said frame to permit adjustment of said attachment pads relative to said frame; a projector; a screen; means to support said projector such that an image is projected by said projector onto the mirror and reflected back to the screen; and image producing means to produce an image from said projector to be reflected off of said mirror back to the screen.

10. The combination called for in claim 9 wherein the means to limit pivotal movement of said pivot plate relative to said base plate comprises: a pin slideably secured through aligned apertures formed in the pivot plate and base plate.

11. The combination called for in claim 10 wherein the means to adjustably secure the base plate relative to the support base comprises legs threadedly secured through apertures formed in the corners of said base plate, said threaded legs engaging the upper surface of said support base; and means to lock said base plate into position relative to said support base.

12. The combination called for in claim 10 with the addition of: a sliding base positioned on the upper surface of the support base such that the sliding base moves relative to the support base, said sliding base being positioned between the base plate and said support base such that the base plate is supported by the sliding base and the sliding base is moveable relative to the support base.

13. The combination called forin claim 10 with the addition of means to indicate when said shaft is level.

14. A mirror alignment device for aligning mirrors having mirror support structure rotatably secured to the mirror on wheel alignment equipment comprising: a shaft; means to rotatably support said shaft in a horizontal plane; a frame; means securing said frame to said shaft such that the frame is perpendicular to said shaft, said frame rotatable with said shaft; support means to secure a mirror and mirror support structure to said frame such that the mirror is perpendicular to said shaft such that the mirror support structure can be rotated with the frame independently of the mirror; adjustment means to move said support means horizontally relative to said frame to permit adjustment of said mirror support structure relative to said frame; projector means to project an image toward the mirror; and means to receive the reflected image.

15. A mirror alignment device for aligning mirrors having mirror support structure rotatably secured to the mirror, the support structure having attachment buttons comprising: shaft support means; a shaft rotatably supported by said shaft support means; means to level said shaft support means; a frame secured to said shaft in a perpendicular plane to said shaft; support means secured to said frame for securing said mirror to said frame comprising upper and lower support bars having an attachment button receiving edge formed thereon to receive the attachment buttons on said mirror support structure said support bars further being positioned horizontally on opposed sides of said shaft; means to secure said support bars to said frame; and means to move said support bars horizontally relative to said frame as the bars remain substantially perpendicular to said shaft.

* * * * *